Figure 1:
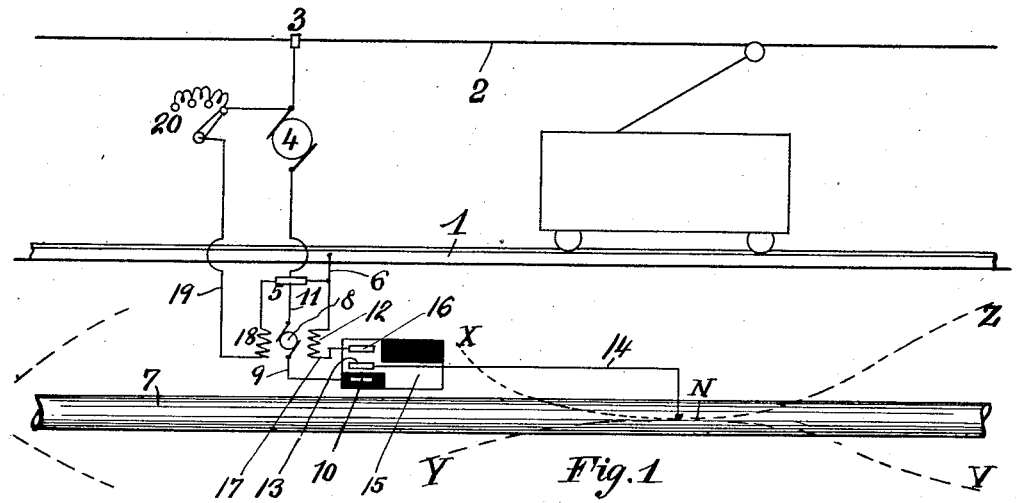

A. B. HERRICK.
ELECTROLYTIC PROTECTION.
APPLICATION FILED OCT. 2, 1909.

1,003,604.  Patented Sept. 19, 1911.

Witnesses
Edmund O. Dubocq.
Peter A. Roe

Inventor
Albert B. Herrick,
By his Attorneys
Edwards, Sager & Wooster.

COLUMBIA PLANOGRAPH CO., WASHINGTON, D. C.

UNITED STATES PATENT OFFICE.

ALBERT B. HERRICK, OF NEW YORK, N. Y.

ELECTROLYTIC PROTECTION.

1,003,604.  Specification of Letters Patent.  Patented Sept. 19, 1911.

Application filed October 2, 1909. Serial No. 520,707.

*To all whom it may concern:*

Be it known that I, ALBERT B. HERRICK, a citizen of the United States, residing at New York, in the county of New York and State of New York, have invented certain new and useful Improvements in Electrolytic Protection, of which the following is a full, clear, and exact specification.

This invention relates to electrolytic protection, and more particularly has reference to a method and apparatus whereby earth conductors may be protected from destructive electrolysis caused by stray currrents from other conductors, such as grounded return circuits of electric railways.

Where an electric railway uses the rails or a grounded circuit for the return current, and there exists a system of pipes, cable sheaths, or other conductors adjacent the rails or grounded return it is known that some current will flow back to the source through the pipes or other secondary conductors. Inasmuch as the rails are in or electrically connected with the earth, and the pipes are in the earth, the latter, being always more or less moist, constitutes an electrolyte between the rails and the secondary conductors, and varying differences of potential will exist between the return and the secondary conductors. At outlying points, the rails are positive with respect to the pipes, and the current tends to flow from the rails to the pipes, while nearer the power station the conditions reverse, and the current tends to flow from the pipes to the rails. Intermediately, there is a neutral district where the pipes are positive and negative. That is, assuming the trolley or current carrying conductor to be positive with respect to the rails. I have observed that the negative area of the secondary conductor is larger than the positive area, and also that the negative potentials of the secondary conductors are higher than the positive in the conductor systems to which this invention relates.

The destructive effects of electrolysis on the underground secondary conductors occur where the latter are positive to the main return, which, therefore become in a sense anodes in the moisture in the earth which constitutes an electrolyte, and subject to attack by oxidation. Where the underground conductors are negative to the rails, hydrates are formed which to a degree are a protective coating. Any portion of the secondary conductor system having high resistance between adjacent sections tending to produce local action will also be subject to similar conditions and to electrolysis of the more positive section. If the current is changed in direction frequently, the chemical action is correspondingly reversed, but an applied alternating electromotive force of sine form, would not result in a corresponding equalization on the structure to be protected since the latter already has an electro-motive force in one direction impressed upon it. Such an impressed alternating electromotive force would not therefore be effective to prevent electrolysis, but would increase it. In other words, current flowing toward the pipe tends to decompose the moist electrolyte surrounding the pipe (or other conductor), and to produce a hydrated condition at the surface, or even to surround the surface with a film of hydrogen. It is this film of hydrogen or the hydrated condition which protects the surface of the conductor. When the potential is reversed upon a conductor in this hydrated condition, the material of the pipe is not immediately dissolved and carried to the relatively negative earth or rail, but the first effect of the reversed current is to overcome the hydrated condition, that is, the hydrogen is carried away and recombines with the elements from which it was dissociated. It is only after all of this hydrogen has been re-combined that the oxygen can reach the surface of the pipe and oxidize it. According to this invention, the current is reversed before the oxygen can attack the surface of the conductor, so that it might be said of this invention it always keeps the positive area of the conductor in a hydrated condition, or a condition tending to hydration. Thus, the electrolysis of the conductor is prevented by oxidizing the hydrogen which normally surrounds the conductor, instead of the conductor itself, and in replacing this hydrogen by more, before the oxygen has a chance to work upon the conductor itself. These effects are obtained by the rapid reversals of potential, the hydrating potential being applied for a longer period than the oxidizing potential. If therefore, the flow of current in the secondary conductor can be kept down to a minimum, and the permitted flow required to take place under such conditions as to prevent oxidation of the positive portions of the secondary conductor, damage by electrolysis will be prevented, while at the same time the rails will more fully perform their intended function of a return circuit, thereby increasing the electrical efficiency of the whole system and obviating the large damage caused by stray return currents.

According to this invention, I propose to prevent electrolysis of such portions of secondary earth conductors as are positive with respect to the rails or other return conductor, by providing means whereby the potential relation between this portion of the secondary conductor or pipe and the rail is caused to oscillate, the oscillations being of such character that the negative condition produces a current flow to the pipe greater than the normal positive flow from the pipe to the rail. Thereby the pipe is maintained in a condition tending to hydration, and oxidation prevented.

In one embodiment of the invention herein described, I provide a small driven machine or potential generator for producing a negative potential, in combination with means such as a commutator and connections for producing periodic oscillations of potential on the pipes. Also, I propose to regulate the intensity of the oscillations according to the current density on the pipes. In another form, these periodic oscillations are produced by a periodic varying of the point of connection of the secondary conductor to the negative side of the distribution system.

The invention will be more fully understood in connection with the description of the accompanying drawings, wherein—

Figure 2:
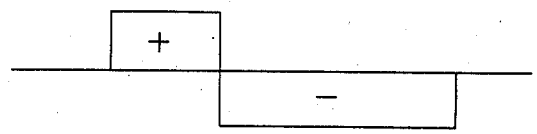
Figure 3:
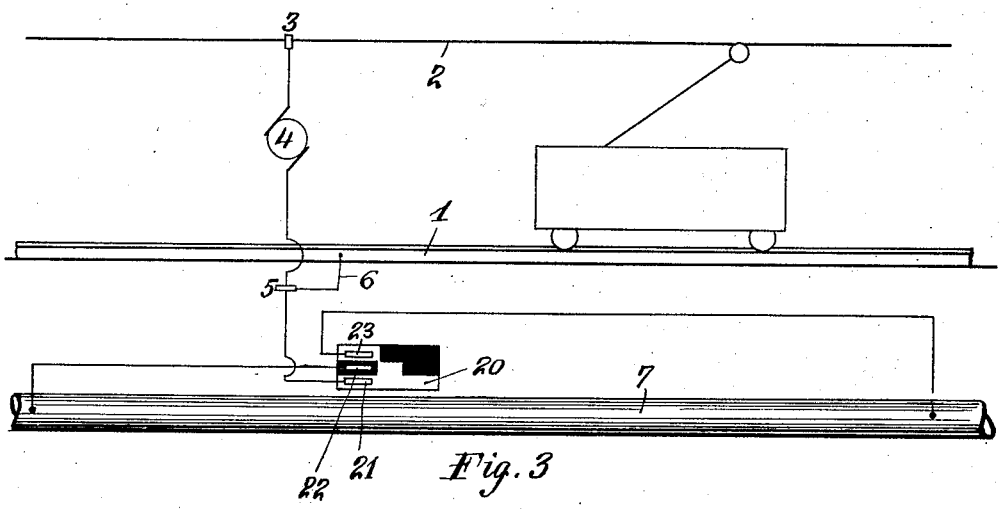

Figure 1 is a diagram of portions of an electric railway distribution system embodying my invention. Fig. 2 is a potential diagram representing unequal positive and negative potentials on the positive area of the pipe, and Fig. 3 shows a modification.

1 represents the rails, 2 the trolley wire, 3 the positive bus-bar, 4 the station generator supplying bus-bar 3, 5 the negative bus-bar, 6 the connection from the rails to the negative bus-bar, and 7 the secondary conductors or pipes, which are to be protected from electrolysis.

In order to carry out the invention, I may provide a small potential generator 8, having one pole connected by a wire 9 to a brush 10, and the other pole connected by a wire 11 to the negative bus-bar 5, which auxiliary machine 8 will be mechanically driven in any suitable manner. An auxiliary field 12 is connected between brush 16 and negative bus-bar 5 by wire 17.

13 is a brush connected by a wire 14 to one or more points in or adjacent to the neutral district of the pipe 7, the location of which neutral district can readily be found by experiment in each individual instance, and 15 is a suitably operated circuit changer or commutator. Lines X N Y and Z N V may be taken to diagrammatically represent the positive and negative areas of the pipe 7. The area X N Y will be the negative area wherein the current generally flows from rail 1 through the moist earth to the pipe 7, so that the pipe 7 tends to become hydrated and thereby protected. The area Z N V may be taken to represent the positive area wherein the pipe 7 is normally positive with respect to the rail 1, so that the current normally tends to leave the pipe and to pass through the moist earth to the rail. It is in this latter area where the damage by electrolysis occurs, though of course damage is caused at points in the pipe where for any reason, such as a bad joint, resistance is such as to cause the current to leave the pipe. It is this positive area which it is the object of this invention to protect. In order to fully protect a system of pipes, it is desirable to reduce the total current flow in the pipes as much as possible. Furthermore, recent decisions of some courts have made it practically compulsory for the railroad companies to carry as little of their return current through underground conductors or pipes, as is possible.

By this invention I cause the potentials on the positive portions of the pipe to be oscillated by the potential generator 8 and the commutator 15, the period during which the hydrating or negative potential is applied to the pipe being longer than the period during which the pipe is normally connected to the negative bus-bar.

18 is a separately excited field circuit for the potential generator connected by wire 19 through rheostat 20 with the positive bus-bar 3, so as to be continuously excited, while the field 12 will remain excited by residual and lagging magnetism in proportion to the current carried by the pipes 7. Thus the total magnetization of the potential generator 8 will vary according to the condition of the whole distribution system, and consequently, the applied negative potential on the pipe will vary. This specific arrangement is herein shown simply as an illustration of one means, since a storage battery connected to periodically apply a negative potential to the pipe could be used, or any other source of potential. It is also not essential to the invention that the applied negative potential be varied according to the condition of the system, though such means is herein shown. It will be observed that when the brushes 10 and 13 are on the left hand side of the commutator there is a negative potential applied to the pipe 7 at the neutral district, or near by, the effect of which is to reduce the normal positive potential of that portion of the pipe nearer the power house, thereby creating a tendency to hydrate this portion of the pipe. When the connection of the brushes is changed to the position shown in the drawing so that brushes 13 and 16 are connected, it will be seen that whatever current there is in the pipe will flow normally through this easier path back to the negative bus-bar, though of course during this period some current tends to flow normally from the positive portions of the pipe to the rail through the earth. It will of course be understood that the electrolytic condition of the moist earth is continually subject to variation on account of the varying quantities of moisture contained therein. In dry weather for instance, very little current leakage will take place from the rails in a well constructed road bed, while in wet weather very considerable leakage will take place. It is also to be observed that the current through the moist earth tends to insulate the positive element, that is, where the current flows from the rails to the pipes, the rails tend to insulate themselves by reason of the decomposition of the moisture in the soil. The same condition exists where the pipe is positive with respect to the rail. These conditions, however, are not stable, but are continually being changed by additional moisture, so that actually the positive conductor does not remain insulated and there is more or less current flowing all the time.

As above pointed out, the negative area of the pipe is greater than the positive area of the pipe, and inasmuch as the negative area tends to be normally more or less hydrated by reason of the current flowing to it through the moist earth, and also has a greater difference of potential than the positive area, relatively to the rails, the periodically increased negative potential is negligible in so far as concerns the negative area, because of the greater length of this area. The negative potential applied to the positive part of the pipe, as when the brushes 10 and 13 are connected, therefore tends to hydrate the positive part by reason of rendering it negative while not affecting the normal negative area. Because of this difference in areas, the negative potential can be applied for greater length of time without causing any damage in the negative area, while at the same time benefiting the positive area of the pipe by making it more negative than it formerly was. For this reason, the brushes 10 and 13 are connected with each other for a longer period than are the brushes 13 and 16, as shown diagrammatically in Fig. 2 wherein the negative wave applied to the positive area of the pipe is of greater period than the permitted normal positive wave from the pipe back to the negative bus-bar.

In Fig. 3, is shown a simpler apparatus for carrying out the invention, wherein the normal positive area of the secondary conductor is periodically moved by means of a commutator 20, having brushes 21, 22, 23 connected respectively with the negative bus-bar 5, and separated portions of the secondary conductor 7, the brush 21 always being connected with the bus-bar, while the rotation of the commutator alternately connects brushes 22 and 23 to this brush 21. Thus the normally positive area will be oscillated and shifted as the connections are changed from one portion of the pipe to another. Whenever these connections are changed, it will be seen that the positive areas of the secondary conductor necessarily change, during which periods the secondary conductor tends to become hydrated, as above described, and as long as the secondary conductor is hydrated no corrosion can take place even though current may be leaving the conductor. Consequently, while one section is tending to be de-hydrated so to speak by any leaving or positive current, the other section is being hydrated by the negative potential, the period not being long enough to allow either section to become entirely de-hydrated and in condition to be attacked by acid ions or by oxygen.

It is thought from the foregoing description, that the nature of the invention and the various means by which its objects are attained, will be thoroughly understood, my invention comprehending broadly a method of preventing electrolysis, wherein the normal potential relation between the pipe and rail is periodically interfered with and set into oscillation in such manner as to shift the location of that portion of the secondary conductor which is normally positive, while not interfering with or changing the normal condition of the negative portion of the pipe. By this invention, it will be seen that the current flowing in the pipe is very considerably reduced, which is a very important result since the amount of destruction by electrolysis is greater where large currents flow upon the pipe. Large currents are also very objectionable wherever there are bad joints in the pipe because at these points local action may occur.

The particular apparatus herein shown may be varied without departing from the spirit of the invention.

Having thus described my invention, I declare that what I claim as new and desire to secure by Letters Patent, is—

1. The method of protecting from electrolysis an earth conductor which is positive to another conductor in one portion and negative in another which consists in periodically reducing the positive potential of said earth conductor without reversing its negative potential.

2. The method of protecting from electrolysis an earth conductor which is positive to another conductor which consists in periodically impressing thereon a negative electromotive force.

3. The method of preventing electrolysis of an earth conductor adjacent a grounded return which consists in alternately connecting said earth conductor to said grounded return and to a source of negative electromotive force.

4. The method of preventing electrolysis of an earth conductor adjacent a grounded return which consists in alternately connecting said earth conductor to said grounded return and to a source of negative electromotive force for different periods.

5. The method of preventing electrolysis of an earth conductor adjacent a grounded return which consists in alternately connecting said earth conductor to said grounded return and to a source of negative electromotive force for different periods, the period of impressed negative electromotive force on said earth conductor being longer than that of said other connection.

6. The method of protecting an earth conductor having portions positive and negative with respect to a return conductor from electrolysis which consists in applying to said earth conductor an electromotive force of such sign as to tend to hydrate the normally positive portion without changing the negative portion to such an extent as to cause it to be electrolyzed.

7. The method of protecting an earth conductor, having portions positive and negative with respect to a return conductor, from electrolysis, which consists in intermittently applying to said earth conductor an electromotive force of such sign as to reverse the normal polarity of the positive portion without changing the polarity of the negative portion.

8. The method of protecting from electrolysis an earth conductor, having portions positive and negative with respect to the negative side of a distribution system, consisting in connecting said earth conductor at a point between said positive and negative portions with the negative side of said distribution system by a conductor, and impressing thereon an electromotive force negative with respect to the positive portion of said earth conductor, but not to such extent as to overcome the normally negative polarity.

9. The method of protecting from electrolysis an earth conductor, having portions of unequal extent positive and negative with respect to the negative side of a distribution system, consisting in connecting said earth conductor at a point between said positive and negative portions with the negative side of said distribution system by a conductor, and impressing thereon an electromotive force negative with respect to the positive portion of said earth conductor, but not to such extent as to overcome the normally negative polarity.

10. The method of preventing electrolysis of an earth conductor which is positive to another conductor, which consists in periodically impressing on the conductor to be protected, intermediate its ends, a negative electromotive force.

11. The method of preventing electrolysis of an earth conductor which is positive to another conductor, which consists in periodically impressing on the conductor to be protected, intermediate its ends, a negative electromotive force varying in accordance with the normal current carried by the earth conductor.

12. The combination with a system of electrical distribution having an earth return, of a secondary earth conductor having one portion normally negative, and another portion normally positive with respect to said return, and means for intermittently applying a negative potential to said normally positive portion.

13. The combination with a system of electrical distribution having an earth return, and a source of negative electromotive force, of a secondary earth conductor having one portion normally negative with respect to said earth return and another portion normally positive with respect to said earth return, and means for intermittently connecting said secondary conductor to a point in said earth return and to said source of negative electromotive force.

14. The combination with a system of electrical distribution having an earth return, of a secondary earth conductor having portions of different polarity with respect to said earth return, and means comprising a source of electromotive force and circuit controlling means whereby to periodically impress upon said secondary conductor a negative electromotive force.

15. The combination with a system of electrical distribution having an earth return, of a secondary earth conductor having portions of different polarity with respect to said earth return, a conductor leading from said secondary return to the negative side of said distribution system, and means for periodically impressing upon said conductor a negative electromotive force.

16. The combination with a system of electrical distribution having an earth return, of a secondary earth conductor having portions of different polarity with respect to said earth return, a conductor leading from a neutral portion of said secondary return to the negative side of said distribution system, and means for periodically impressing upon said conductor a negative electromotive force.

17. The combination with a system of electrical distribution having an earth return, of a secondary earth conductor having portions of different polarity with respect to said earth return, a conductor leading from said secondary return at a point unequally distant from the ends thereof to the negative side of said distribution system, and means for periodically impressing upon said conductor a negative electromotive force.

18. The combination with a system of electrical distribution having an earth return, of a secondary earth conductor having portions of different polarity with respect to said earth return, a conductor leading from said secondary return to the negative side of said distribution system, and means for periodically impressing upon said conductor a negative electromotive force at a point nearer the generating station than the outermost end.

19. The combination with a system of electrical distribution having an earth return, of a secondary earth conductor having portions of different polarity with respect to said earth return, a conductor leading from said secondary return to the negative side of said distribution system, and means for periodically impressing upon said conductor a negative electromotive force, the periods of application of said electromotive force being of different length than the intervals.

20. The combination with a system of electrical distribution having an earth return, of a secondary earth conductor having portions of different polarity with respect to said earth return, a conductor leading from said secondary return to the negative side of said distribution system, and means for periodically impressing upon said conductor a negative electromotive force, the duration of said electromotive force being longer than the intervals.

In testimony whereof I affix my signature, in presence of two witnesses.

ALBERT B. HERRICK.

Witnesses:
J. S. WOOSTER,
CLARENCE G. BOYDEN.

---

Copies of this patent may be obtained for five cents each, by addressing the "Commissioner of Patents, Washington, D. C."